(12) United States Patent
Storer et al.

(10) Patent No.: US 6,298,734 B1
(45) Date of Patent: Oct. 9, 2001

(54) ROCKER STYLE SENSOR SYSTEM FOR USE IN A VORTEX SHEDDING FLOWMETER

(75) Inventors: William James A. Storer, Loveland; Sheldon Tuck, Erie, both of CO (US)

(73) Assignee: VorTek Instruments LLC, Longmont, CO (US)

(*) Notice: Subject to any disclaimer, the term of this patent is extended or adjusted under 35 U.S.C. 154(b) by 0 days.

(21) Appl. No.: 09/526,644

(22) Filed: Mar. 16, 2000

Related U.S. Application Data (60) Provisional application No. 60/124,904, filed on Mar. 17, 1999.

(51) Int. Cl.[7] .................................................. G01F 1/32
(52) U.S. Cl. .................................... 73/861.22; 73/861.24
(58) Field of Search ......................... 73/861.22, 861.19, 73/861.21, 861.24

(56) References Cited

U.S. PATENT DOCUMENTS

| | | | |
|---|---|---|---|
| 4,835,436 | * | 5/1989 | Lew ................................... 73/861.22 |
| 4,911,019 | * | 3/1990 | lew ................................... 73/861.24 |
| 5,123,285 | * | 6/1992 | Lew ................................... 73/861.22 |
| 5,736,647 | * | 4/1998 | Matsubara et al. ............... 73/861.22 |
| 5,869,772 | * | 2/1999 | Storer ............................... 73/861.24 |

* cited by examiner

Primary Examiner—Harshad Patel
(74) Attorney, Agent, or Firm—F. A. Sirr; Holland & Hart LLP (57) ABSTRACT

A vortex shedding flowmeter includes a sensor assembly received within a sleeve assembly that has a sensor tab extending into the fluid stream. The sleeve assembly includes a flexible sleeve portion that can flex slightly in the presence of vortices. The flexible sleeve exerts a force on a rocker arm of the sensor assembly which causes the sensor assembly to pivot about a pair of piezoelectric crystals mounted therein. A unique electrode pad and split electrode arrangement relative to the piezoelectric crystals is employed to provide the voltage signals from the piezoelectric crystals to a sensing circuit. The flowmeter can be used in either in-line or insertion applications. Alternatively, the sensor assembly can be provided with a sensor tab on an end thereof and the sleeve assembly replaced with a bellows housing that retains the sensor assembly and allows the rocker arm to deflect slightly in the presence of vortices while the bellows associated with the bellows housing prevents fluid from entering the electronics portion of the flowmeter.

13 Claims, 7 Drawing Sheets

ROCKER STYLE SENSOR SYSTEM FOR USE IN A VORTEX SHEDDING FLOWMETER

CROSS REFERENCE TO OTHER APPLICATIONS

This application claims priority from U.S. Provisional Patent Application No. 60/124,904, for A ROCKER STYLE SENSOR SYSTEM FOR USE IN A VORTEX SHEDDING FLOWMETER, filed Mar. 17, 1999, the contents of which are incorporated herein by reference.

FIELD OF THE INVENTION

The present invention relates to an improved vortex shedding flowmeter, and more particularly to an improved sensor arrangement in a vortex shedding flowmeter.

BACKGROUND OF THE INVENTION

Vortex flowmeters are known in the art. They can be used to measure the mass flow rate (typically used for gaseous delivery conduits) or volumetric flow rate (typically used for liquid delivery conduits) of a fluid flowing through a conduit. The mass flow rate is equal to the density of the fluid flowing in the conduit times the velocity of the fluid times the cross-sectional area of the conduit. The density can be treated as a constant with a value of the density provided in advance for the calculation, in the cases where density is a known constant, such as for liquid delivery systems. Alternatively, the density can be calculated in a known fashion from an equation of state such as the ideal gas law, if the pressure and temperature of the gas can be sensed. Accordingly, some vortex flowmeters also include sensors for sensing the pressure and temperature of the fluid in the conduit. The volumetric flow rate is equal to the velocity of the fluid times the cross-sectional area of the conduit.

Figures 1, 2:
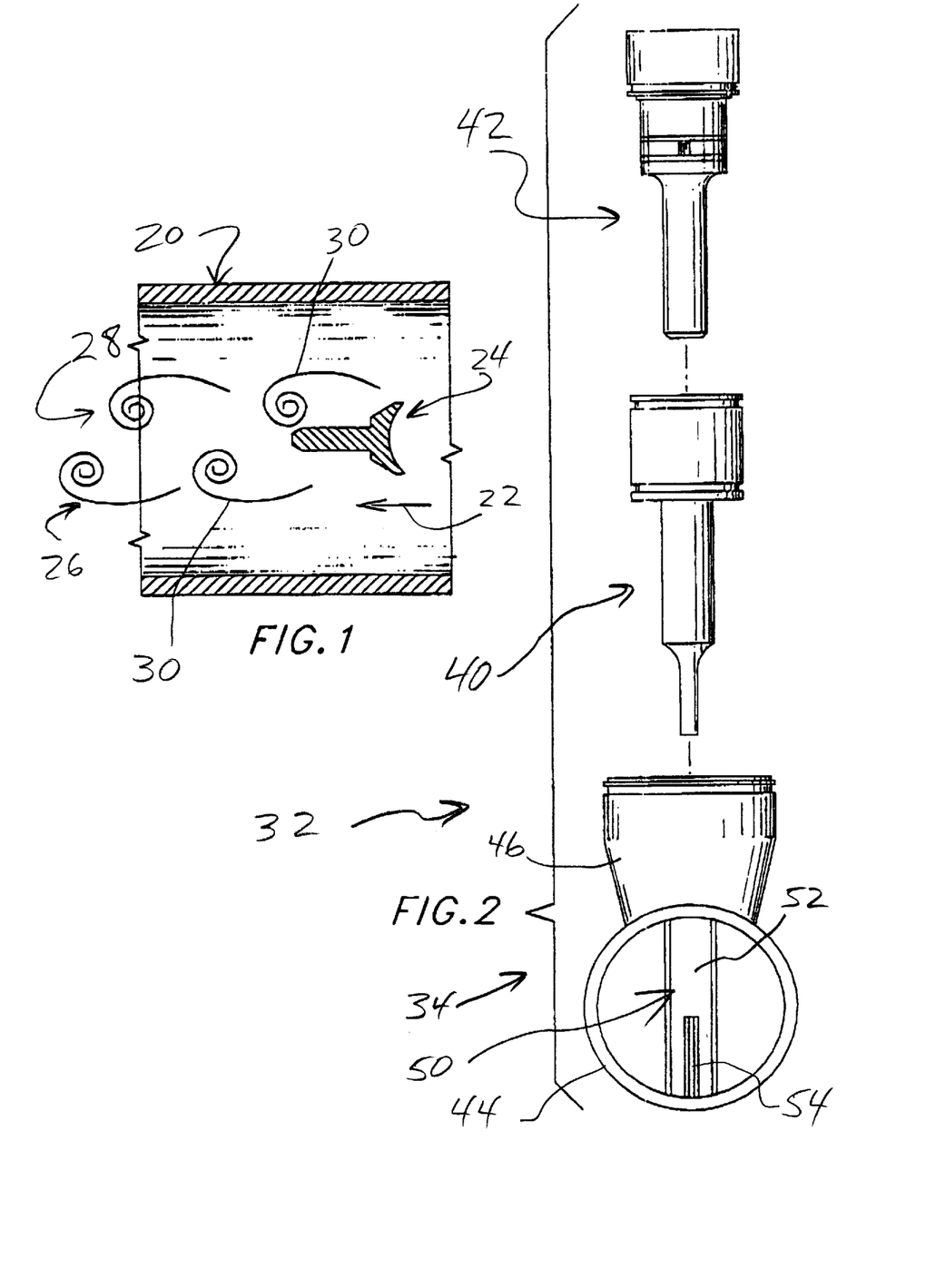
FIG. 1 is a cross-sectional view of a bluff body in a fluid conduit creating two wakes of alternating vortices.
FIG. 2 is an exploded elevation view of the major components of the vortex flowmeter of the present invention.

As can be seen, the calculation of mass flow rate and volumetric flow rate each require a determination of the fluid velocity. Fluid velocity is typically measured in vortex flowmeters by inserting a bluff body, or shedder bar, into the flow of turbulent fluid and counting the frequency of the vortices produced thereby, since the frequency of the vortices is proportional to the fluid velocity for well-designed flowmeters. As shown in FIG. 1, a conduit 20 with fluid flowing therethrough in a direction shown by an arrow 22 will form vortices after passing a bluff body 24 placed in the conduit 20. The vortices will be alternately created in wake 26 or wake 28 formed on opposite sides of the bluff body 24. Each of the wakes 26 and 28 are composed of a series of vortices 30. The vortices 30 of wake 26 rotate counterclockwise, while the vortices 30 of wake 28 rotate clockwise, as seen in FIG. 1. The vortices 30 are generated one at a time, alternating between the opposite sides of the bluff body 24. The vortices 30 interact with their surrounding space by overpowering every other nearby swirl on the verge of development. It is known in the art that the distance (or wavelength) between successive vortices is constant, within a given distance downstream of the bluff body 24. Since the distance between successive vortices is constant and the inside diameter of the flow conduit is constant, the three-dimensional volume of fluid between the vortices is also constant. By sensing the number of vortices passing by the sensor in a given time, the vortex flowmeter can compute the total volume of fluid which is passed through the conduit in that same given amount of time.

It is important for the fluid flow through the conduit to be turbulent rather than laminar. Turbulent flow is determined using the well known dimensionless number called the Reynolds Number:

$$Re = \frac{\rho V D}{\mu}$$

where
   Re=Reynolds Number
   ρ=mass density of the fluid being measured
   V=velocity of the fluid being measured
   D=internal diameter of the fluid conduit
   μ=viscosity of the fluid being measured The Strouhal Number is the other dimensionless number that quantifies the vortex phenomenon. The Strouhal Number is defined as:

$$St = \frac{fd}{V}$$

where
   St=Strouhal Number
   f=frequency
   d=equals width of the bluff body
   V=equals fluid velocity Well-designed vortex flowmeters exhibit a constant Strouhal Number across a large range of Reynolds Numbers, indicating a consistent linear output over a wide range of flows and fluid types. Below this linear range, intelligent electronics automatically correct for the variation in the Strouhal Number with a Reynolds Number. Known smart electronics correct for this non-linearity by calculating the Reynolds Number based on either constant values of the fluid's density and viscosity stored in the instrument's memory or measured values of pressure and temperature in an equation of state (such as the ideal gas law) for density in an equation to predict viscosity.

Vortex flowmeters can be used in either in-line or insertion applications. In in-line applications, the flowmeter body includes a section of fluid conduit which may have flange connections at opposite ends for connection to opposed ends of an existing fluid conduit. Insertion type vortex flowmeters may include a shroud which houses a bluff body and a sensor that can be inserted into an existing fluid conduit or pipeline via an opening on the radial wall of the fluid conduit.

While there are many vortex flowmeter products available on the market today and disclosed in the patent literature, it is believed that there are none that optimally fit the following requirements for a vortex flowmeter: high sensitivity (expressed as the ratio between the maximum and the minimum measurable flow rates, also known as the turndown ratio), rugged, able to withstand pressure fluctuations, substantially free from sensitivity to vibration, inexpensive, reliable, and compact. In particular, it is desirable to design a vortex flowmeter with improved signal-to-noise ratios, a decrease in the sensitivity to vibration, and with a design that can be easily and cost-effectively manufactured. For example, there are other vortex flowmeters available today that may satisfy certain of these parameters but may be relatively difficult to manufacture. For example, some vortex flowmeters require sensors that are difficult to mount, wires that are difficult to connect to the sensors, and designs that require the potting of the sensor into a sensor tube.

It is against this background and the desire to solve the problems of the prior art that the present invention has been developed.

SUMMARY OF THE INVENTION

The present invention is related to a vortex flowmeter for sensing characteristics of fluid flow through a conduit. The flowmeter includes a housing affixed to the conduit, an elongated, flexible sleeve affixed to the housing at one end and having a sensor tab defined at an opposite end, and an elongated sensor affixed to the housing at one end. The sensor has an elongated finger defined at an opposite end, the elongated finger having a longitudinal axis. The finger is slidably received within the flexible sleeve, the sensor having a sensing element therein that senses forces normal to the longitudinal axis. The housing is attachable to the fluid conduit in a manner to allow at least a portion of the flexible sleeve, with the sensor slidably received therein, to extend into the conduit so that the sensor tab can be located in the vicinity of vortices in the flow of fluid through the conduit. The flexible sleeve flexes in response to the vortices in the vicinity of the sensor tab, the sensor sensing the normal forces imparted by the flexible sleeve.

The housing may include a shroud extending into the fluid conduit in the vicinity of the sensor tab. The sensor tab may be located within a cylindrical section of the shroud. The shroud may include a bluff body mounted thereto upstream of the sensor tab. The bluff body may have a downstream-protruding wall generally aligned with and underneath the sensor tab. The sensor tab may have a downstream edge that is generally aligned with a downstream edge of the downstream-producing wall.

The elongated sensor may include a pair of spaced-apart, disc-shaped piezoelectric crystals having radial centers generally aligned with the longitudinal axis of the sensor, and the sensor also includes an electrode arrangement located between and contacting the pair of piezoelectric crystals. The electrode arrangement may include a pair of generally C-shaped electrodes, and the pair of piezoelectric crystals each include a pair of generally C-shaped electrode pads on opposed faces of the pair of crystals, and a generally circular electrode pad on outer faces on the pair of crystals. The sensor may further include a mounting base that is held in relationship with the finger to compress the pair of crystals and pair of electrodes therebetween, and wherein the housing, the flexible tube sleeve, and the mounting base and finger of the sensor are each composed at least primarily of electrically conductive metal, and further wherein the circular outer electrodes of each of the pair of crystals electrically contact one of the mounting base and the finger of the sensor. The mounting base may be held relative to the finger of the sensor by a screw. The finger may be significantly less flexible than the flexible sleeve. The pair of crystals may be electrically polled along substantially the same axis as the direction that the force is applied to the pair of crystals. The crystals may be pre-loaded in compression to create an electrical signal therefrom of a given polarity.

The present invention is also related to an elongated sensor for a flowmeter having a body affixable to a fluid conduit through which a flow rate of fluid is to be measured by sensing vortices produced in the fluid. The sensor includes a piezoelectric crystal, a pair of electrodes on opposite sides of the piezoelectric crystal, and an extended finger attached to one side of the piezoelectric crystal. The opposite side of the crystal is adapted for attachment to the body of the flowmeter. The extended finger is caused to move slightly in the direction of the vortices in the fluid and this slight movement causes the piezoelectric crystal to be slightly physically distorted by placing the piezoelectric crystal into one of the states of compression and tension. This distortion of the piezoelectric crystal causes a change in an electrical signal generated between the pair of electrodes.

The piezoelectric crystal, the pair of electrodes, and the extended finger may be substantially aligned along a single axis. The slight movement of the finger may cause compression of one region of the piezoelectric crystal and tension in an opposite region of the piezoelectric crystal. There may be two aligned piezoelectric crystals. There may be a pair of split electrodes between the two spaced-apart and facing piezoelectric crystals. Each of the pair of piezoelectric crystals has a pair of split electrode pads formed thereon for electrical contact with corresponding ones of the pair of split electrodes. The sensor includes an upper sensor housing that is adapted for attachment to the body of the flowmeter, wherein the upper sensor housing is attached to the finger by a screw in a manner to sandwich the piezoelectric crystals and the electrodes between the upper sensor housing and the finger. The piezoelectric crystals may have a hole defined therethrough to allow the screw to pass therethrough.

The present invention is also related to a method of sensing vortices in fluid streams. The method includes: providing a bluff body to create vortices in the fluid stream; providing an elongated, cantilevered member protruding from a flowmeter into the fluid stream downstream from the bluff body; and measuring pivotal movement of the cantilevered member with a transducer provided between the cantilevered member and the flowmeter.

The present invention is also related to a method of manufacturing a flowmeter. The method includes: providing an elongated rocker arm with a longitudinal, cylindrical hole defined therein; stacking a first, disc-shaped, annular piezoelectric crystal having an annular electrode pad on one side thereof and a pair of split electrode pads on an opposite side thereof, the crystal and the electrode pads having holes defined therein, with the annular electrode pad facing toward the rocker arm; stacking a pair of split electrodes on top of the pair of split electrode pads; stacking a second, disc-shaped, annular piezoelectric crystal having an annular electrode pad on one side thereof and a pair of split electrode pads on an opposite side thereof, the crystal and the annular electrode pad having a pair of holes defined therein, with the annular electrode pad facing away from the split electrodes; inserting a pair of dowel pins through the crystals and annular electrode pads, one through each of the pair of holes in the crystals and annular electrode pads; stacking an upper sensor housing onto the stack of crystals and electrodes, the upper sensor housing having a pair of corresponding holes therein for aligning with and receiving the dowel pins, the upper sensor housing having a hole also defined at a radial center thereof; placing a screw through the radially-centered hole in the upper sensor housing, through the annular crystals and electrode pads, between the split electrodes, and threadedly engaging the screw into the cylindrical hole in the rocker arm; removing the dowel pins; inserting a pair of electrical signal wires through the upper sensor housing and the crystals and annular electrode pads, one through each of the pair of holes in the crystals and annular electrode pads; and electrically bonding each of the electrical signal wires to a corresponding one of the split electrodes.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Figure 9:
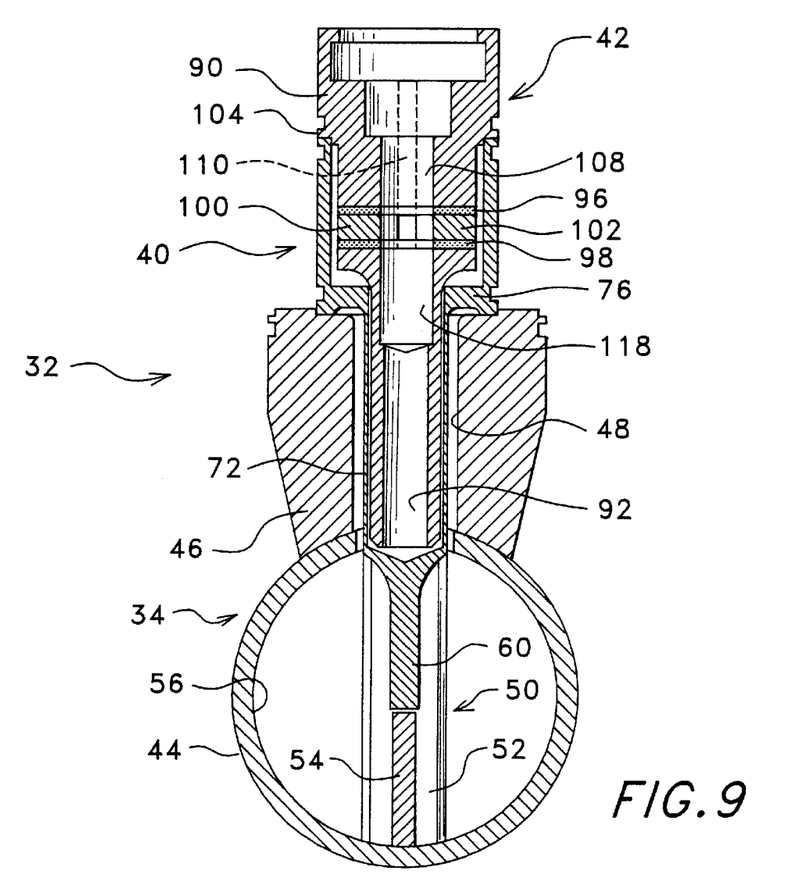
FIG. 9 is a cross-sectional rear view of the vortex flowmeter of the present invention.

A flowmeter 32, shown in FIGS. 2 and 9, includes a shroud housing 34 that is attachable to a stem tube or stem tube adapter 36 (FIG. 10) for insertion of the flowmeter 32 into a fluid conduit 38. The flowmeter 32 also includes a sleeve assembly 40 that is received within the shroud housing 34 with at least a portion extending into the fluid flow. A sensor assembly 42 is received within and welded to the sleeve assembly 40, which in turn is welded to the shroud housing 34.

Figure 10:
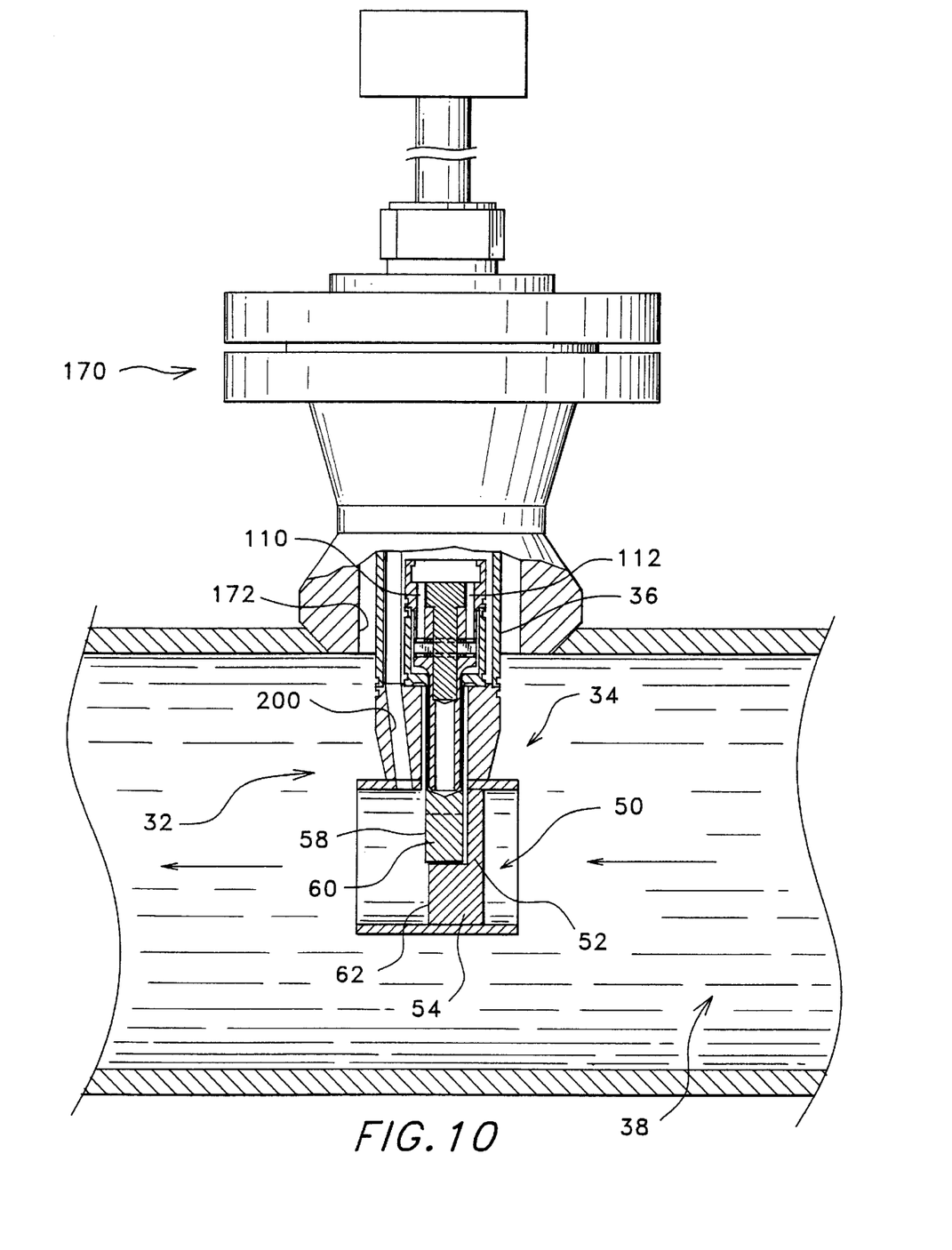
FIG. 10 is an elevation view of a vortex flowmeter according to the present invention, when used in an insertion application, showing portions of the fluid conduit and vortex flowmeter in cross-section.

As shown in FIGS. 2, 9, and 10, the shroud housing 34 includes a cylindrical shroud tube 44 that is welded to a shroud tube saddle 46, that in turn is welded to the stem tube adapter 36 and the sleeve assembly 40. The shroud tube saddle 46 includes a cylindrical conduit 48 therethrough and is in fluid communication with the shroud tube 44 to allow the sleeve assembly 40 to extend through the shroud tube saddle 46 and into the shroud tube 44. The shroud tube is preferably cylindrical and includes a shredder bar or bluff body 50 having a transversely-extending upstream face or wall 52 and a longitudinally-extending downstream fin or wall 54. The upstream wall 52 preferably extends from the bottom to the top of a fluid conduit 56 formed by the shroud tube 44, as shown in FIGS. 9 and 10. The downstream wall 54 may only extend for approximately half the distance from the bottom to the top of the fluid conduit 56, to allow a portion of the sleeve assembly 40 to extend into the space in the fluid conduit 56 above the downstream wall 54 and downstream from the upstream wall 52. As can be seen in FIG. 10, a downstream edge 58 of a sensor tab 60 on the sleeve assembly 40 may or may not be aligned with a downstream edge 62 of the downstream wall 54, so that either could be further downstream. Preferably, the width of the upstream wall 52 is approximately one-fourth of the diameter of the fluid conduit 56, as is generally shown in FIG. 9. In addition, it is found to be preferable for the upstream wall 52 of the bluff body 50 to be located toward the upstream end of the fluid conduit 56 of the shroud tube 44. Further detail on the bluff body and shroud tube can be found in currently-pending U.S. patent application Ser. No. 09/411,183, entitled "Insertion Vortex Flowmeter," filed Oct. 1, 1999, the contents of which are incorporated herein by reference.

Figures 3, 4, 5:
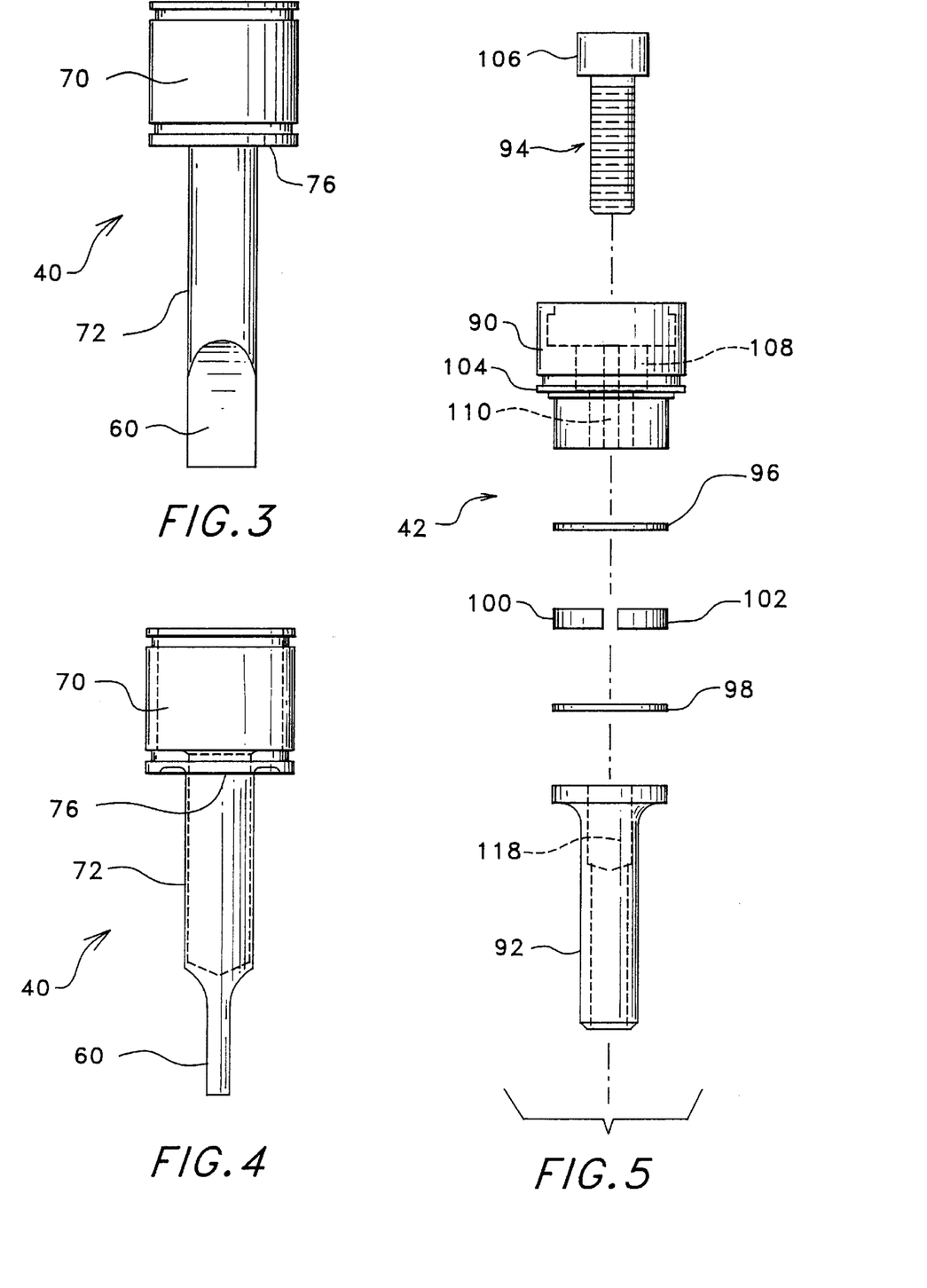
FIG. 3 is an elevation side view of a sleeve assembly from the vortex flowmeter of FIG. 2.
FIG. 4 is an elevation front view of the sleeve assembly of FIG. 3.
FIG. 5 is an exploded elevation view of a sensor assembly of the vortex flowmeter of FIG. 2.

The sleeve assembly 40, shown in FIGS. 3 and 4, includes a sensor isolation barrel 70 with an elongated, flexible sleeve 72 extending therefrom, the flexible sleeve 72 having a sensor tab 60 formed at an opposite end thereof. As can be seen in FIG. 9, the sensor isolation barrel 70 is generally a hollow cylinder with a bottom wall 76 having a hole defined therethrough, placing the interior of the sensor isolation barrel 70 in fluid communication with the hollow, cylindrical interior of the flexible sleeve 72. The flexible sleeve 72 is preferably composed of a suitable metal, such as stainless steel, and has a suitable wall thickness to be sufficiently flexible yet not so thin as to be likely to fail easily. One suitable thickness is approximately 0.010 inches. It is important for the flexible sleeve 72 to be able to operate over a wide range of desirable operating temperatures as well as to be thin enough to be slightly flexible yet still strong enough to prevent fatigue and failure of the part. The flexible sleeve 72 has typically been manufactured by drilling a hole in a solid rod of stainless steel, so it has been difficult to easily obtain thinner walls on the sleeve, although other suitable means of manufacture may be possible.

The sensor assembly 42, as shown in FIG. 5, includes an upper sensor housing 90 to which a finger or rocker arm 92 is attached by a screw 94, sandwiching therebetween an upper and lower piezoelectric crystal 96 and 98, respectively, and a pair of split electrodes 100 and 102. As can be seen in FIG. 9, the upper sensor housing 90 has a shoulder 104, in the form of a lip thereon which engages with and is welded to the upper edge of the sensor isolation barrel 70. The interior of the upper sensor housing 90 is generally hollow and cylindrical to allow the screw 94 to be received therein. The screw 94 includes a screw head 106 that engages with an upper edge of an inner sleeve 108 within the upper sensor housing 90. Preferably, the screw 94 may be tightened to a torque of a 100 inch-pounds, or any other suitable torque to sufficiently pre-load the piezoelectric crystals 96 and 98, as described further below. Radially outside of the inner sleeve 108 are a pair of longitudinally-formed, cylindrical passageways 110 and 112 that lead between the lower edge of the upper sensor housing 90 and the open, upper region of the upper sensor housing 90. The passageways 110 and 112 are used during manufacture of the sensor for insertion of dowel pins (not shown) to align the piezoelectric crystals 96 and 98 and the electrodes 100 and 102, as described in further detail below. Eventually, the dowel pins are removed and electrical signal wires 116 are inserted through the passageways 110 and 112 for welding or conductive cementing to the split electrodes 100 and 102.

The screw 94 passes through holes 114 formed at the radial center of piezoelectric crystals 96 and 98 and between the split electrodes 100 and 102 for rotational engagement with a threaded inner cylindrical passageway 118 through the rocker arm 92. In this manner, the sensor assembly 42 is held together.

Figure 6:
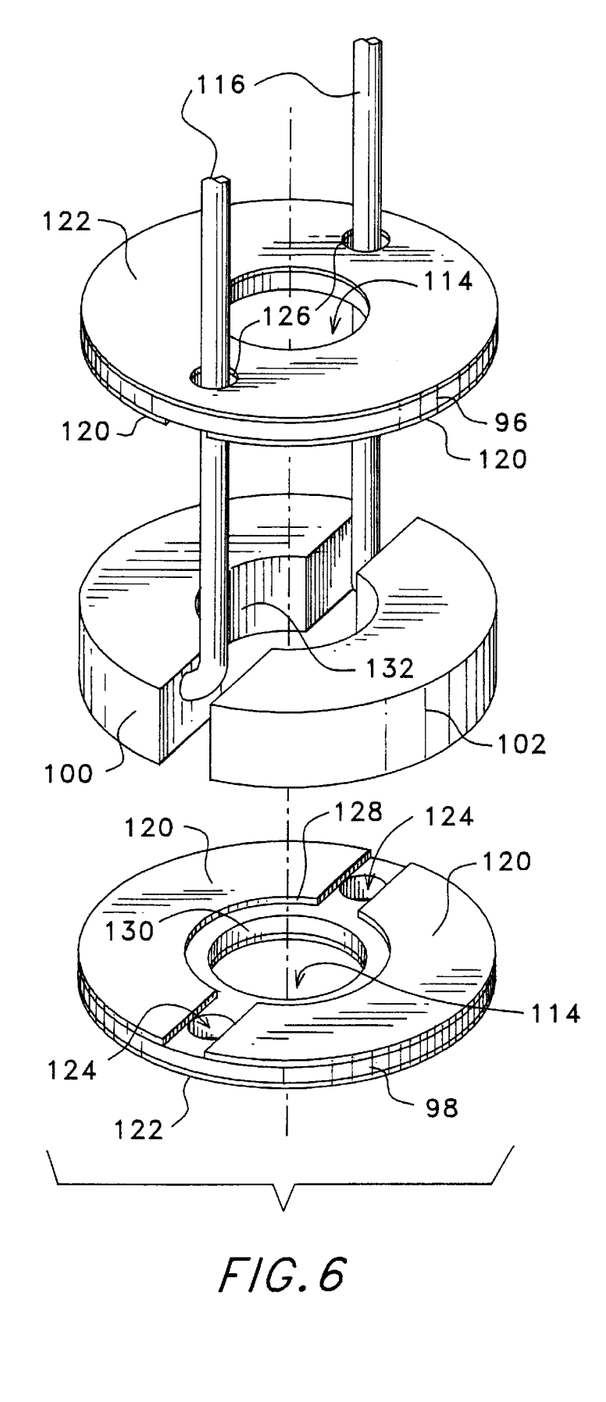
FIG. 6 is an exploded perspective view of a pair of piezoelectric crystals and a pair of split electrodes associated therewith.

As can be seen in FIG. 6, each of the piezoelectric crystals 96 and 98 include a pair of C-shaped electrode pads 120 on one side thereof and a single, annular electrode pad 122 on opposite sides thereof. The C-shaped electrode pads 120 are provided on the inner, opposed, or facing sides of the two piezoelectric crystals 96 and 98. Conversely, the annular electrode pads 122 are provided on the opposite or outer sides of the piezoelectric crystals 96 and 98. The piezoelectric crystals 96 and 98 are also of annular shape with a pair of holes 124 defined therethrough for passage of the aforementioned dowel pins and electrical signal wires 116. The holes 124 are located 180 degrees apart from each other on the annular piezoelectric crystals 96 and 98. The C-shaped electrode pads 120 are positioned relative to the holes so that the aforementioned dowel pins or electrical signal wires 116 can pass therethrough. The annular electrode pads 122 also have corresponding holes 126 for alignment with the holes 124 in the piezoelectric crystal 96 and 98.

An inner radial edge 128 of the C-shaped electrode pads 120 has a larger radius and is thus displaced from an inner radial edge 130 of the piezoelectric crystals 96 and 98. An inner radial edge 132 of the split electrodes 100 and 102 is also of a larger radius than the inner radial edge 130 so as to be generally aligned with the inner radial edge 128. Displacing the inner radial edges 128 and 132 serves to prevent electrical contact between the screw 94 and the split electrodes 100 and 102 or the C-shaped electrode pads 120. There is not a similar issue with the annular electrode pads 122 because these pads 122 are designed to come into contact with the metal upper and lower portions of the sensor assembly 42, namely the upper sensor housing 90 and the rocker arm 92. Thus, the electrode pads 122 can be considered to be neutral or ground so that electrical signals are provided relative to ground on each of the piezoelectric crystals 96 and 98. These signals can be sensed by comparing each of the split electrodes 100 and 102 to electrical ground.

Figure 7:
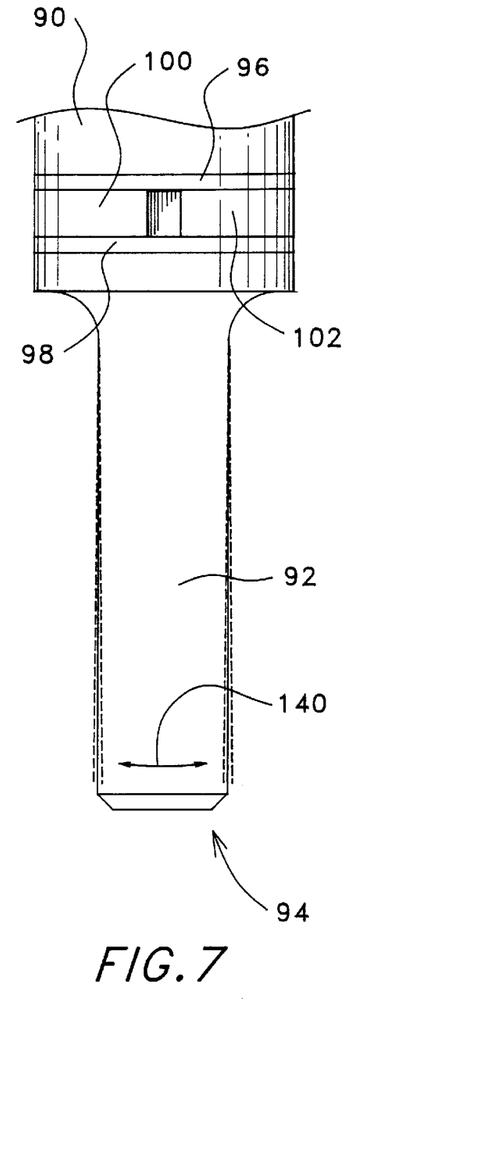
FIG. 7 is an elevation view of the sensor assembly of FIG. 5, showing in solid lines the normal rest position for a rocker arm of the sensor assembly, and in phantom lines, exaggerated positions that the rocker arm could be flexed to when subjected to forces in the direction of the arrow.
Figure 8:
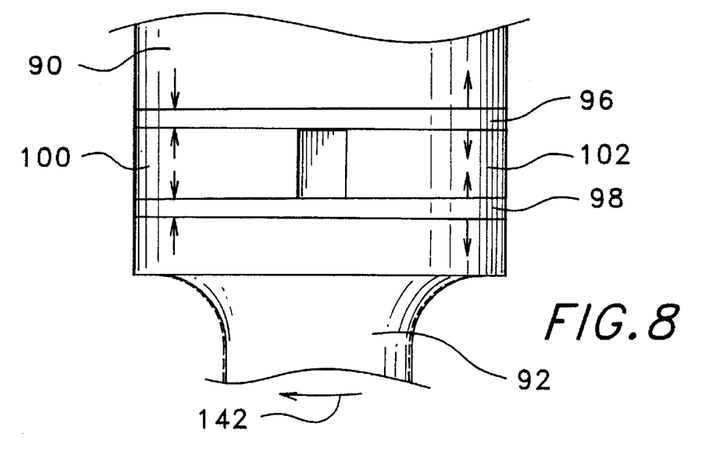
FIG. 8 is an exploded view of a portion of the sensor assembly showing compression of one side of each of the pair of piezoelectric crystals and a tensional force created on an opposite side of each of the pair of piezoelectric crystals when a force is exerted on the rocker arm in the direction of the arrow.

The sensor assembly 42 is designed so that the most flexible portions thereof are the piezoelectric crystals 96 and 98. Thus, when the upper sensor housing 90 is welded to the sensor isolation barrel 70 and is eventually affixed to the fluid conduit 38 in which it is desired for the flowmeter 20 to measure the fluid flow therethrough, any movement or force acting near the end of the rocker arm as exemplified by the double headed arrow 140 in FIG. 7, will cause the sensor assembly 42 to pivot slightly about its most flexible portion, the piezoelectric crystals 96 and 98. Thus, when the upper sensor housing 90 of the sensor assembly is held in a fixed position and a lateral or translational force 140 is applied to the end of rocker arm 92 as shown in FIG. 7, the end of the rocker arm 92 will tend to be slightly displaced as shown by the exaggerated phantom lines in FIG. 7. As further shown in FIG. 8, this displacement in the direction of force arrow 142 will cause compression on one side (the left side in FIG. 8) of each of the piezoelectric crystals 96 and 98 and tension on the other side (the right side in FIG. 8) of the crystals 96 and 98. As is commonly known with piezoelectric crystals, when a mechanical force is applied between faces or sides of the crystal, a voltage is created between those faces of the crystal on which the force is exerted. The voltage will vary depending on the force exerted upon the crystal. Thus, with no pre-loading of the crystal, a compression force will create a voltage of a first polarity between the faces of the crystal. A tensional force will tend to create a voltage of an opposite polarity between the faces of the piezoelectric crystal. Because of the pre-loading of the piezoelectric crystals 96 and 98 by the torque applied to the screw 94, the crystals 96 and 98 are compressed sufficiently to provide an initial voltage prior to any movement of the rocker arm 92. This initial voltage is bled off through the feedback resistors in the circuitry described below so that the nominal voltage is zero. The additional compressional and tensional forces created by movement of the rocker arm 92 will vary the voltage about this nominal voltage.

As can be seen in FIG. 9, the sidewalls of the flexible sleeve 72 of the sleeve assembly 40 are significantly thinner than the sidewalls of the rocker arm 92 of the sensor assembly 42. Thus, when the sensor tab 60 experiences a differential pressure between its two opposite sides, the flexible sleeve 72 will flex slightly to allow the sensor tab 60 to deflect toward the lower pressure region. This will occur when a vortex is passing by the sensor tab 60, because the vortex will create a lower pressure region as compared to the fluid flow on the opposite side of the sensor tab 60 from the vortex. When the sensor tab 60 deflects in this manner, the flexible sleeve 72 imparts a force against the rocker arm 92 which is sensed by the piezoelectric crystals 96 and 98 in the form of an increased voltage in one region of the crystals 96 and 98 and a decreased voltage in an opposite region of the crystals 96 and 98. This voltage on the crystals is passed via the electrode pads 120 and 122, the split electrodes 110 and 102, and the electrical signal wires 116 to an electrical circuit 150.

Figure 12:
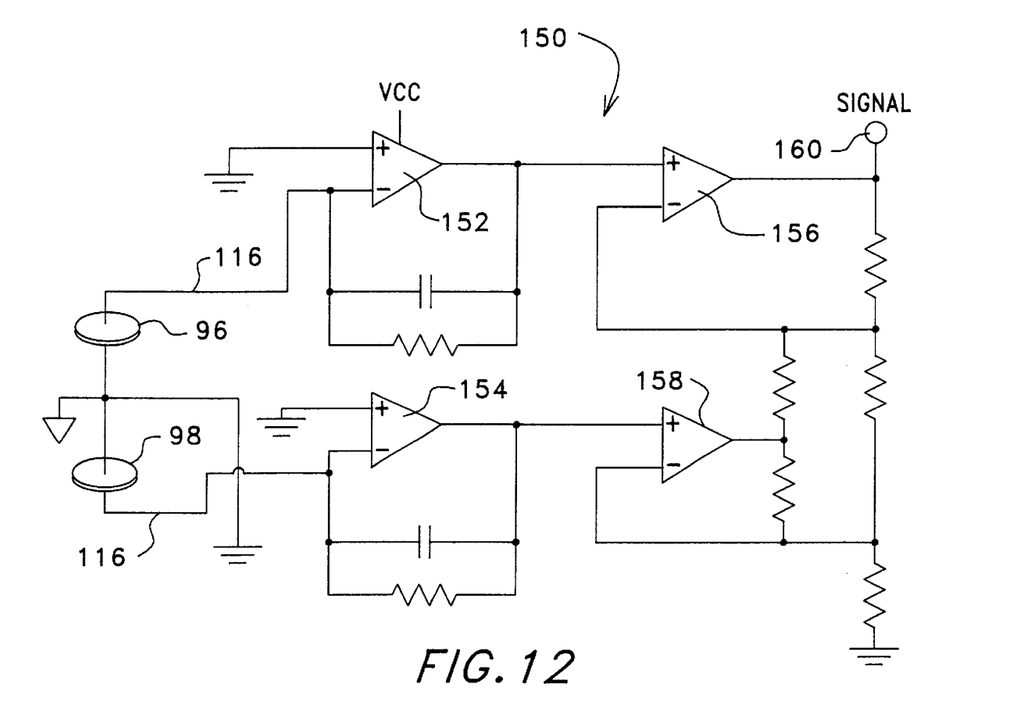
FIG. 12 is a schematic diagram of the electrical circuitry of the vortex flowmeter of the present invention.

The electrical circuit 150 is shown in schematic representation in FIG. 12. Since one region of the piezoelectric crystals are in compression when the opposite region is in tension, the electrical signals from the two regions will be 180 degrees out-of-phase with each other. In addition, the noise from vibrations should be similarly out-of-phase from each other. As the rocker arm rocks back and forth, the signals from each electrode will oscillate, and the frequency of these oscillations can be sensed. As can be seen, the signal from one side of the piezoelectric crystals 96 and 98 is connected to ground. The signals from the other side of the piezoelectric crystals 96 and 98 are provided through the electrical signal wires 116 to a first pair of buffer amplifiers (typically referred to in the industry as "charge amplifiers") 152 and 154 and the signals therefrom are then provided to a second pair of buffer amplifiers 156 and 158. The signals from the second pair of buffer amplifiers 156 and 158 are summed together to provide an output signal 160.

In this way the frequency of the vortex shedding can be transmitted to the associated electronics and since the frequency is directly and linearly proportional to the volume of fluid passing through the meter, the associated electronics can compute the volumetric flow rate.

As an alternative, since the greater the velocity the greater the difference in pressure between the center of the vortex and the normal line pressure (as explained by Bernoulli's theorem) a larger force will be transmitted to the piezoelectric crystals which will develop a greater charge (either positive or negative) in direct proportion to the greater force. Bernoulli's theorem states that the difference in pressure will be proportional to the fluid density times the square of the fluid velocity. Since the vortex shedding frequency is proportional to the fluid velocity, ratioing the amplitude of the charge developed on the surfaces of the piezoelectric crystals to the frequency of the vortex shedding as determined by the associated electronics will ratio (density * $V^2/V$) yielding (density * V) which can be multiplied by a fixed calibration constant determined during manufacturing to yield an alternative means for calculating the mass flow rate of the fluid.

A common problem experienced by vortex shedding flowmeters is the detrimental effect of physical vibration on their ability to measure the vortex shedding. This stems from the fact that the magnitude of the pressure differential generated between a vortex and the normal fluid pressure is proportional to the density times the square of velocity. To operate over a 10 to 1 ratio of maximum to minimum flow rate the magnitude of the differential pressure will vary by a factor of 100. This means that at low flow rates the force transmitted to the piezoelectric crystals and the electrical charge generated will be very small. Looking at the present invention, it will be clear to someone skilled in the art that since the two halves of the piezoelectric crystals 96 and 98 are generating charges of opposite polarity with a phase difference of 180 degrees relative to each other, they should be combined in a differential amplifier effectively subtracting the two signals which will double the amplitude and eliminate common mode noise signals which could be either electrically or mechanically generated. The most common electrically generated common mode noise is caused by the alternating electrical current used to power most devices. Assuming this electrical signal is equally coupled into both halves of the piezoelectric crystals and their associated wiring, it will be effectively canceled by the subtraction in the differential amplifier.

In addition, there is mechanically-generated common mode noise from hydrodynamic noise generated in liquids, and to a lesser extent in gases, by the action of centrifugal or reciprocal pumps. The amplitude of the hydrodynamic pressure wave generated in this way can be much larger than the pressure differential generated by the action of vortex shedding at low flow rates. In the current invention, this hydrodynamically generated pressure will push the sensor tab 60 directly up causing a force to be transmitted equally and in the same direction to both piezoelectric crystals 96 and 98 which will generate equal electrical signals in both amplitude and phase which, when transmitted to the associated electronics will be subtracted by the differential amplifier. Thus the present invention is unaffected by hydrodynamic noise.

Figure 11:
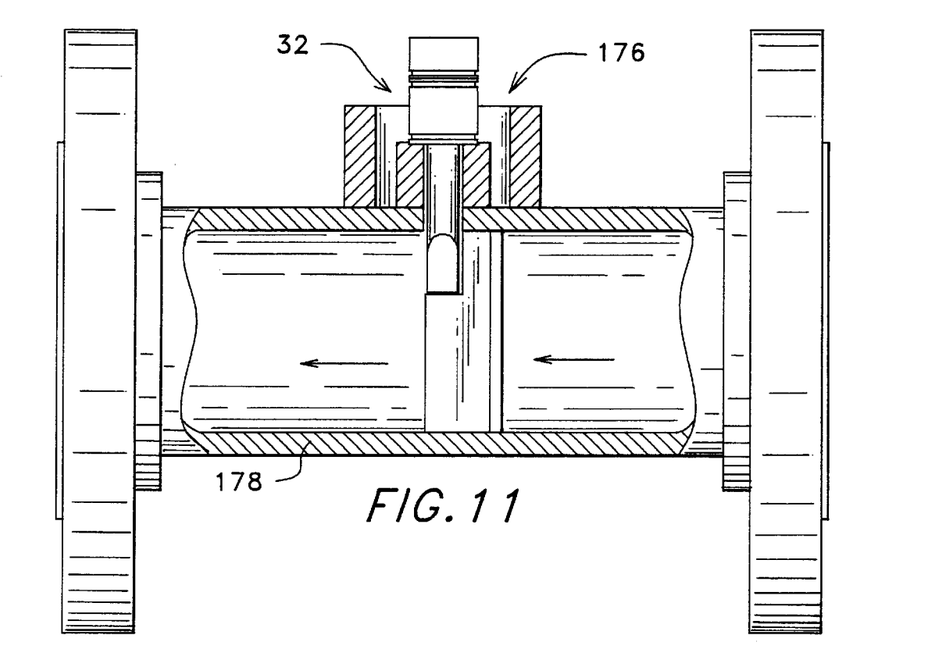
FIG. 11 is an elevation view of a vortex flowmeter according to the present invention showing the vortex flowmeter in an in-line application, showing portions of the fluid conduit in cross-section.

As can be seen in FIG. 10, the flowmeter 32 of the present invention can be inserted through a fitting 170 having a passageway 172 into an existing fluid pipeline 38. Conversely, as is shown in FIG. 11, the flowmeter 32 can be inserted through a fitting 176 provided in a section of an in-line fluid pipeline 178. The section of pipeline 178 can then be attached to the open ends of other fluid pipelines (not shown). Since it is desirable for some flowmeters to sense temperature and pressure to determine the density of the flowing fluid, a passageway 200 is shown in FIG. 10 for inserting temperature and pressure sensors.

There are many advantages that the flowmeter of the present invention has over the prior art. The orientation of the piezoelectric crystals allow the crystal to be polled in its "33" orientation as opposed to its "31" orientation like many of the prior art sensors. By polling along the same orientation as the mechanical forces are applied, a higher signal is obtained from the crystal, thus reducing the signal-to-noise ratio. This ability is also important in high-temperature applications where it is difficult, if not impossible, to obtain crystals that can be adequately polled in the "31" orientation. Further, the arrangement of the pair of crystals allow for higher signal levels to be obtained, also reducing the signal-to-noise ratio. Also, moving parts are minimized to make this flowmeter more reliable. The flowmeter also has a high turndown ratio, because of the rugged design, lack of moving parts, and use of piezoelectric crystals as the sensing device. In addition, this flowmeter is relatively easy to manufacture as compared to many of the prior art sensors.

Figure 13:
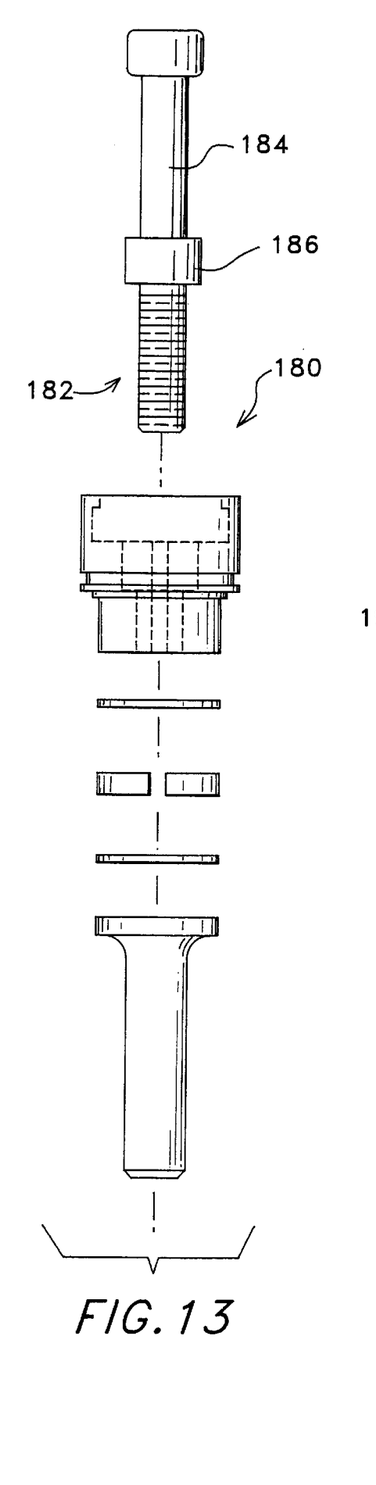
FIG. 13 is an exploded elevation view of a second embodiment of the sensor assembly of a vortex flowmeter assembled according to the present invention, in which a vibration sensing beam has been added to the sensor assembly.

As an alternative to the flowmeter 32 discussed above, a second embodiment of a sensor assembly 180 could be provided in a flowmeter. This second embodiment of the sensor assembly 180 is very similar to the sensor assembly 42 with the exception that the screw 94 of the first embodiment is replaced with a screw 182 having a vibration sensing beam 184 extending from and defined on the head 186 of the screw 182. The intention of this design is for the vibration sensing beam 184 to react similarly to the rocker arm to external vibrations. It is intended that the vibration sensing beam will cause an equal and opposite force to be imparted on the piezoelectric crystals as the force imparted by the rocker arm. In this manner, the unintended creation of electrical signals from external vibrations may be reduced.

Figure 14:
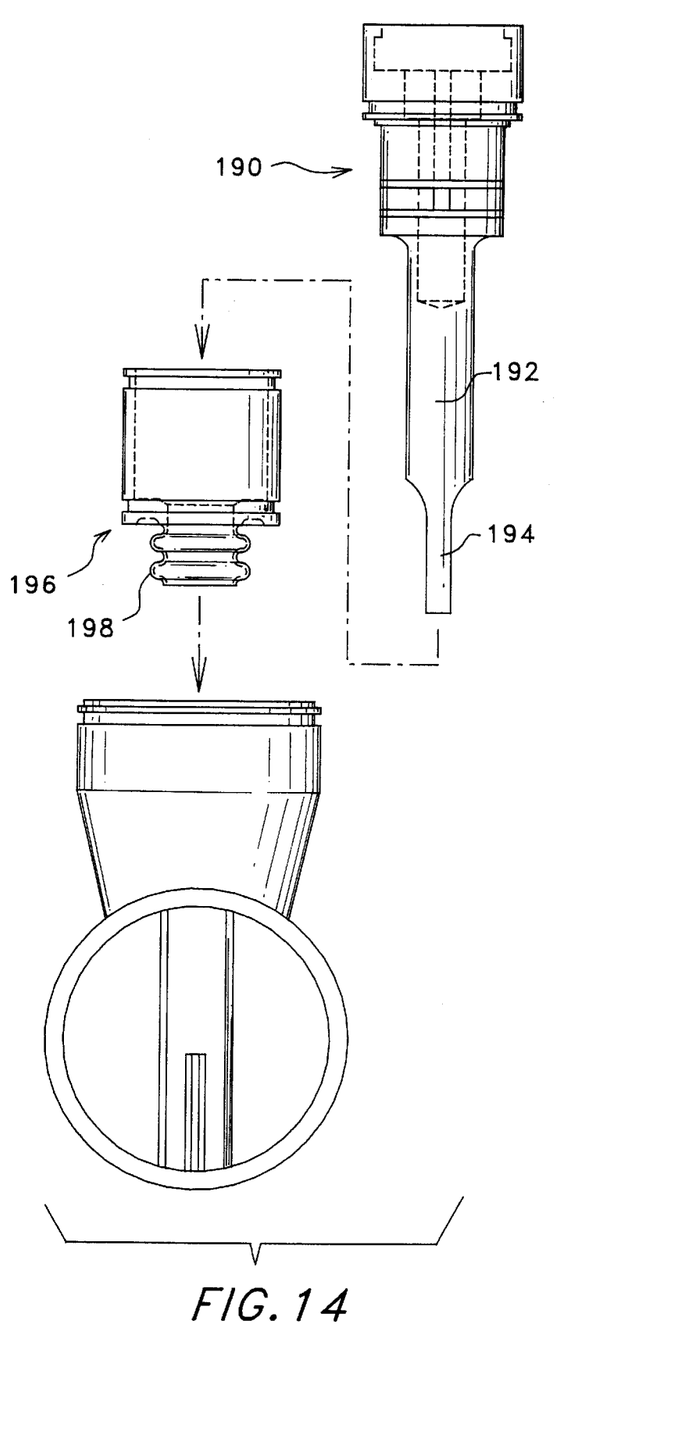
FIG. 14 is an exploded elevation rear view of a third embodiment of a vortex flowmeter assembled according to the present invention, in which a sensor assembly has a sensor tab at a distal end thereof and is slidably received within a flexible bellows housing.

Another embodiment of a flowmeter according to the present invention, as shown in FIG. 14, involves a sensor assembly 190 similar to the sensor assembly 42 of the first embodiment, with the exception that the rocker arm 192 of the sensor assembly 190 has a sensor tab 194 defined at a distal end thereof. With this embodiment, the sleeve assembly 40 of the first embodiment is replaced with a bellows housing 196 to which the sensor assembly 190 can be welded. Instead of a flexible sleeve 72, the bellows housing 196 includes a bellows 198 defined along the bottom thereof for engagement with the rocker arm 192 so as to prevent fluid from flowing further up the sensor assembly 190. In this embodiment, the sensor tab 194 is slightly deflected by the passing vortices in the fluid stream and the force caused thereby will cause the entire sensor assembly 190 to pivot slightly about the piezoelectric crystals retained therein.

It should be understood that the various assemblies of the flowmeter of the present invention have been designed to have very little movement, so as to minimize mechanical failure due to fatigue. One of skill in the art will recognize that the movements of the flexible sleeve have been exaggerated somewhat for ease of illustration and explanation.

While the flowmeter of the present invention has been described with regard to sensing velocity for flow rate calculations by counting the frequency of vortices, it is also possible to calculate mass flow rate by calculating the ratio of the amplitude of the movement of the sensor tab to the frequency, since this ratio is proportional to the density of the fluid times the velocity of the fluid.

In the above detailed description, the particular piezoelectric crystals used were Model No. PZT-5A, from Morgan Matroc Electro Ceramics of Bedford, Ohio, although suitable substitutes could be used. Most of the remaining parts of the flowmeter were manufactured from 316 stainless steel, although suitable substitutes could be used.

While the invention has been particularly shown and described with reference to a preferred embodiment thereof, it will be understood by those skilled in the art that various other changes in the form and details may be made without departing from the spirit and scope of the invention. It should be understood that this description has been made by way of example, and that the invention is defined by the scope of the following claims.

We claim:

1. A vortex flowmeter for sensing vortex characteristics of a fluid that flows through a flow conduit, comprising:

a housing sealed to the flow conduit, said housing having an elongated housing conduit that communicates with the flow conduit, said housing conduit defining a housing axis that intersects said flow conduit;

an elongated, hollow and flexible sleeve having an open end affixed to said housing such that an axis of said sleeve is positioned generally coincident with said housing axis, said hollow sleeve having a closed end located within the flow conduit;

said hollow sleeve extending through said housing conduit and forming a sensor tab that is located at said closed end of said hollow sleeve;

an elongated sensor slidably received within said hollow sleeve such that an axis of said elongated sensor is positioned generally coincident with said housing axis, said elongated sensor having a threaded end, and said elongated sensor having a sensing end located within said closed end of said hollow sleeve;

a pair of spaced apart and disc-shaped piezoelectric crystals located adjacent said threaded end of said elongated sensor such that a first crystal is positioned generally adjacent to said threaded end of said elongated sensor;

each of said crystals having a centrally located through hole generally aligned with said housing axis;

an electrode arrangement located between said pair of crystals;

a sensor housing having a first surface and a second surface physically engaging a second of said crystals, said sensor housing having a through hole generally aligned with said housing axis; and a rotatable fastener having a head physically engaging said first surface of said mounting base and having a threaded member that freely passes through said through holes within said sensor housing and said disks to engage said threaded end of said elongated sensor;

rotation of said fastener operating to compress said pair of crystals between said second surface of said sensor housing and said threaded end of said elongated sensor.

2. A flowmeter as defined in claim 1 wherein said housing includes a shroud extending into the flow conduit generally parallel to said sensing end of said elongated sensor.

3. A flowmeter as defined in claim 2 wherein said pair of crystals are electrically polled generally along said housing axis.

4. A flowmeter as defined in claim 2 including:

an elongated vibration sensing beam extending from said head of said rotatable fastener;

said vibration sensing beam extending along said housing axis and in a direction away from said sleeve.

5. A flowmeter as defined in claim 2 wherein said sensing end of said elongated sensor is located within a cylindrical section of said shroud.

6. A flowmeter as defined in claim 5 wherein said shroud includes a bluff body positioned at a location upstream of said sensing end of said elongated sensor.

7. A flowmeter as defined in claim 6 wherein said bluff body includes a downstream protruding wall generally aligned with and under said sensing end of said elongated sensor.

8. A flowmeter as defined in claim 7 wherein said sensing end of said elongated sensor includes a downstream edge generally aligned with a downstream edge of said downstream protruding wall.

9. A flowmeter as defined in claim 1 wherein said pair of disk-shaped piezoelectric crystals include a pair of generally C-shaped electrode pads on inner faces of said crystal pair and an annular electrode on outer faces of said crystal pair.

10. A flowmeter as defined in claim 9 wherein said housing, said hollow sleeve, said sensor housing and said elongated sensor are composed of an electrically conductive metal, and wherein said pair of C-shaped electrode pads are electrically connected with one electrode pad connected to said sensor housing and with the other electrode pad connected to said elongated sensor.

11. A flowmeter as defined in claim 10 wherein said elongated sensor is less flexible than said hollow sleeve.

12. A method of sensing vortices in a fluid stream, comprising the steps of:

providing a bluff body positioned to create vortices in the fluid stream downstream of said bluff body;

providing a hollow, elongated and cantilevered member that protrudes into the fluid stream at said downstream location;

providing an elongated and cylindrical sensing finger having a first end and a second end having a cylindrical hole defined therein;

placing said first end of said sensing finger within said cantilevered member;

placing a first disc-shaped piezoelectric crystal on said second end of said sensing finger, said first crystal having an annular electrode on one side thereof and a pair of split electrodes on an opposite side thereof, said annular electrode being adjacent to said second end of said sensing finger;

placing a pair of C-shaped electrode pads on said opposite side of said first crystal and in alignment with said pair of split electrodes on said opposite side of said first crystal;

placing a second disc-shaped piezoelectric crystal on said pair of C-shaped electrode pads, said second crystal having an annular electrode on one side thereof and a pair of split electrodes on an opposite side thereof, said split electrodes being adjacent to and in alignment with said pair of C-shaped electrode pads;

providing a sensor housing on said annular electrode of said second crystal; and providing an adjustable fastener extending between said sensor housing and said cylindrical hole at said second end of said sensing finger;

adjustment of said fastener operating to force preload said first and second crystals by compressing said first and second crystals between said sensor housing and said second end of said sensing finger.

13. A method of manufacturing a flowmeter, comprising the steps of:

providing an elongated sensing finger having a first end and having a second end with a cylindrical hole defined therein;

providing a first disc-shaped piezoelectric crystal having an centrally-located through hole, an annular electrode on one side thereof, and a pair of split electrodes on an opposite side thereof, said annular electrode and said first crystal having a first pair of through holes aligned with physical spaces between said pair of split electrodes;

placing said first crystal on said second end of said sensing finger with said annular electrode facing said second end of said sensing finger and with said centrally located through hole in alignment with said cylindrical hole;

placing a pair of split electrode pads on top of and in alignment with said pair of split electrodes of said first crystal with physical spaces between said split electrode pads being aligned with said first pair of through holes;

providing a second disc-shaped piezoelectric crystal having a centrally located through hole, an annular electrode on one side thereof, and a pair of split electrodes on an opposite side thereof, said annular electrode and said second crystal having a second pair of through holes therein aligned with physical spaces between said pair of split electrodes;

placing said second crystal on said pair of split electrode pads with said split electrodes of said second crystal being aligned with and facing said pair of split electrode pads, with said second pair of aligned through holes being aligned with said first pair of aligned through holes, and with said centrally located through hole in alignment with said cylindrical hole;

inserting first and second dowel pins into said first and second pairs of aligned through holes;

placing a sensor housing on said second crystal, said sensor housing having a pair of through holes receiving said first and second dowel pins, and said sensor housing having a centrally located through hole in alignment with said cylindrical hole, placing a screw through said centrally located through hole in said sensor housing and into said cylindrical hole;

tightening said screw to compress said first and second crystals between said sensor housing and said threaded end of said elongated sensor;

removing said dowel pins;

inserting a pair of electrical signal wires into said first and second pairs of aligned through holes; and electrically connecting each of said pair of electrical signal wires to a different one of said split electrode pads.

* * * * *